Patented July 1, 1941

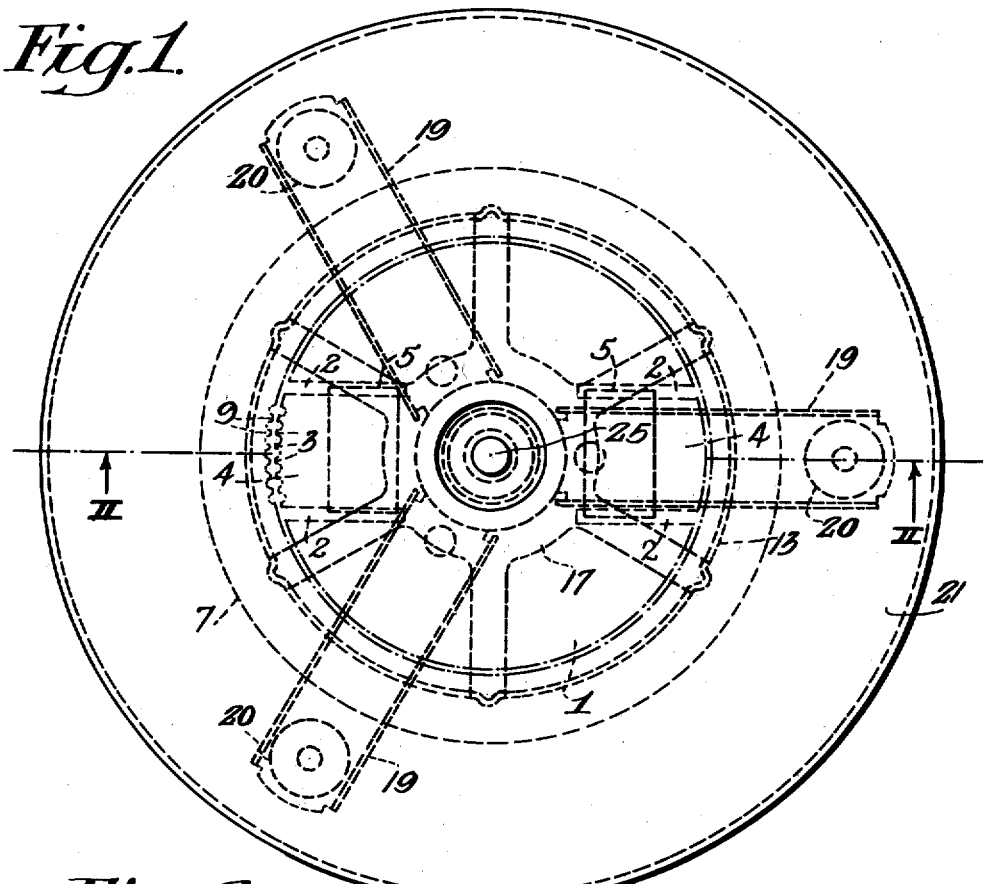
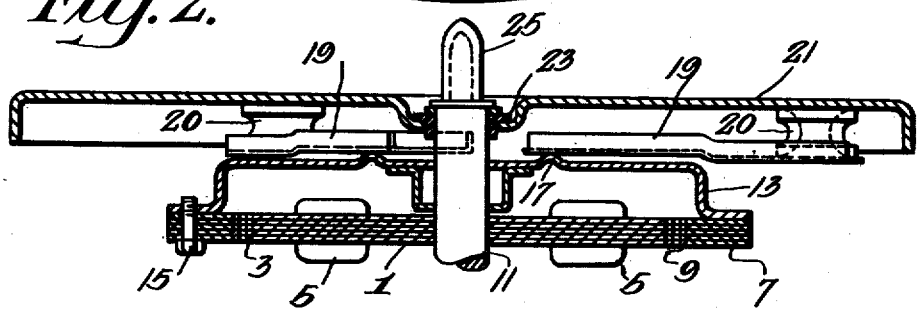
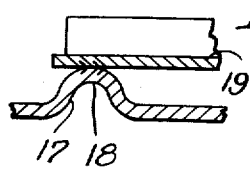

2,247,648

UNITED STATES PATENT OFFICE 2,247,648

MOTOR

Gregory W. Blessing, Moorestown, N. J., assignor to Radio Corporation of America, a corporation of Delaware Application September 1, 1939, Serial No. 292,997

3 Claims. (Cl. 274—9)

This invention relates to electric motors of the synchronous type, and more particularly to a motor adapted for use particularly in phonographic apparatus, the present invention being an improvement upon that disclosed in Patent No. 2,157,158.

The primary object of my present invention is to provide an improved motor and turntable mounting of the type disclosed in the aforementioned patent but in which the transfer to the turntable of mechanical vibrations arising in the rotating parts of the motor will be practically entirely eliminated.

More particularly, it is an object of my present invention to provide an improved motor and turntable mounting as aforesaid by means of which the transfer of mechanical vibrations to a record supported on the turntable for playing will be eliminated.

It is also an object of my present invention to provide an improved synchronous motor and turntable assembly of the type set forth, the cost of which is greatly reduced, which may readily be assembled in manufacture, and which is highly efficient in use.

In accordance with my present invention, I secure a disc-like member to the rotor element of the synchronous motor and to the turntable shaft or spindle. At some particular radius from the axis of rotation of the disc, there is a circumference along which practically no vibrations of the disc in a direction normal to its plane of rotation occur, and I secure to the disc, circumferentially thereabout at said particular radius, a plurality of radially outwardly extending arms to which I connect the turntable by a plurality of resilient elements in much the same manner as in the above identified patent. Not only does this practically entirely eliminate transfer of mechanical vibrations arising in the motor from reaching the turntable and the record supported thereby, but, since the solid disc provides a greater return path for the magnetic flux flowing between the stator and rotor elements of the motor than does the spider construction of the above noted patent, a thinner field structure may be employed, since there will be less flux leakage. Hence, it is possible to build the motor with less laminations and still obtain the same efficiency. Obviously, this greatly reduces the cost of the motor.

The novel features that I consider characteristic of my invention are set forth with particularity in the appended claims. The invention itself, however, both as to its organization and method of operation, together with additional objects and advantages thereof will best be understood from the following description of one embodiment thereof, when read in connection with the accompanying drawing in which Figure 1 is a plan view of a motor and turntable assembly embodying my present invention, Figure 2 is a sectional view taken along the line II—II of Fig. 1, and Figure 3 is a fragmentary sectional view showing the coupling between the disc on the rotor and the turntable supporting structure.

Referring more particularly to the drawing, wherein similar reference characters designate corresponding parts throughout, I have shown a synchronous motor comprising a laminated stator 1 provided with a plurality of peripheral teeth 3 constituting pole faces and having a plurality of inwardly extending, parallel slots 2 which form a pair of diametrically opposed tongues 4 on which a pair of energizing coils 5 are mounted. The motor also includes an annular rotor 7 surrounding the stator 1 and provided with a series of internal teeth 9 of substantially the same arcuate length as the teeth 3, the teeth 9 cooperating with the teeth 3 to constitute cooperating pole faces. In addition, the motor is also provided with a turntable shaft or spindle 11 which may be suitably mounted for rotation in a manner shown, for example, in the above identified patent.

Secured to the spindle 11 in any suitable manner is a somewhat dished, disc-like member 13 to which the rotor 7 is secured, as by means of bolts 15. As noted previously, there is some particular radius with respect to the axis of rotation of the shaft 11 at which vibrations of the disc-like member 13 in a direction normal to its plane of rotation either will not occur at all or will be a minimum, and at this particular radius, I form a circular corrugation 17 to which I secure a plurality of radially extending arms 19, as by spot welding 18 or the like, so that the arms 19, which are spaced equally circumferentially about the member 13, have contact therewith only at the corrugation 17. At their outer ends, each of the arms 19 carries a somewhat spool-shaped, soft rubber member 20, the members 20 serving to connect to the arms 19 a turntable 21 carried by the shaft 11 and preferably insulated therefrom by a rubber sleeve 23 in the manner also shown in the above identified patent. The shaft 11 also preferably carries a rubber tip 25, as also shown in the aforementioned patent.

A phonograph turntable mounted on a motor as previously described is markedly free from any disturbing mechanical vibrations such as produce rumble. Care should be taken that the arms 19 should have suitable clearance from the disc 13, except at the corrugation 17, and from other parts of the motor, as clearly shown in Fig. 2, so that it will not contact portions thereof where higher amplitude vibrations exist. The radius at which the corrugation 17 is formed may be determined experimentally, for example, by a series of vibration tests in well known manner. Results of such tests which I have conducted show, for example, that for a disc pressed from cold rolled, dead soft steel 1/16" thick having a rim diameter of 4 11/16" and dished on an inside diameter of 3 11/16" to internal height of 3/8", the corrugation 17 should be formed on a radius of the order of 11/16" from the center of the disc.

Although I have shown but one embodiment of my invention, I am fully aware that many modifications thereof are possible. I therefore, do not wish to be limited except insofar as is made necessary by the prior art and by the spirit of the appended claims.

I claim:

1. In a phonograph, the combination of a prime mover including a rotary member subject to varying vibrations in a direction normal to its plane of rotation at different radii from its axis of rotation and having a minimum of such vibrations at some particular radius from its axis of rotation, a turntable adapted to support a record for playing, a plurality of radially extending members secured to said rotary member at said particular radius circumferentially about said rotary member, and means coupling said turntable to said radially extending members.

2. In a phonograph, the combination of a synchronous motor including a rotatable shaft and a rotor, a disc-like member secured to said rotor and to said shaft for rotation with said shaft on the shaft axis and in response to energy supplied to said rotor, said disc-like member being subject to varying vibrations in a direction normal to its plane of rotation at different radii from said axis and having a minimum of such vibrations at some particular radius from said axis, a turntable adapted to support a record during playing, and means coupling said turntable to said disc-like member, said coupling means being secured to said member at said particular radius circumferentially about said member.

3. The invention set forth in claim 2 characterized in that said coupling means comprises a plurality of radially extending arms, and resilient means connecting said arms to said turntable.

GREGORY W. BLESSING.